United States Patent [19]

Reppert et al.

[11] Patent Number: 4,960,404

[45] Date of Patent: Oct. 2, 1990

[54] SUPERPOSITION STEERING SYSTEM WITH INTEGRATED MECHANICAL AND INFINITELY VARIABLE DRIVES

[75] Inventors: Rudi Reppert, Fussen; Franz-Xaver Zaunberger, Augsburg, both of Fed. Rep. of Germany

[73] Assignee: Renk Aktiengesellschaft, Augsburg, Fed. Rep. of Germany

[21] Appl. No.: 411,096

[22] Filed: Sep. 22, 1989

[30] Foreign Application Priority Data

Sep. 24, 1988 [DE] Fed. Rep. of Germany ....... 3832529

[51] Int. Cl.$^5$ .............................................. F16H 37/06
[52] U.S. Cl. ....................................... 475/23; 475/22; 180/644
[58] Field of Search ..................... 475/21, 22, 23, 27, 475/29; 180/6.44, 6.48

[56] References Cited

U.S. PATENT DOCUMENTS

| | | | |
|---|---|---|---|
| 3,938,604 | 2/1976 | Kugler et al. | 180/6.44 |
| 4,327,603 | 5/1982 | Zaunberger et al. | 475/22 |
| 4,497,218 | 2/1985 | Zaunbergere et al. | 475/18 |

*Primary Examiner*—Dirk Wright
*Attorney, Agent, or Firm*—Natter & Natter

[57] ABSTRACT

A superposition steering system for a track vehicle includes an infinitely variable steering drive unit integrated with an engine driven mechanical steering input drive to provide a reduction in the amount of power to be transmitted by the variable steering drive to only 20% of the total steering power. The system includes a steering transmission having five epicyclic differential gears and five shift couplings with the differential gears and shift couplings so connected that for shifting from one operating speed to another, in each instance, only one shift coupling is required to be opened and another shift coupling required to be closed. Because of the small number of shift couplings, operating reliability is increased and shifting between various stages can take place quickly to provide high vehicle maneuverability.

10 Claims, 13 Drawing Sheets

A

SUPERPOSITION STEERING SYSTEM WITH INTEGRATED MECHANICAL AND INFINITELY VARIABLE DRIVES

BACKGROUND OF THE INVENTION

1. Field of the Invention

This invention relates generally to steering systems for tracked vehicles and more particularly to a superposition steering system having a steering transmission which integrates infinitely variable and mechanical input drives.

2. History

Steering systems for tracked vehicles such as military tanks have featured an infinitely variable hydrostatic steering unit comprising variable speed pumps which drove hydraulic motors. The hydraulic motors, in turn, engaged a zero or neutral shaft which was interconnected to a pair of summation planetary gears each of which drove one of the vehicle tracks or chains through an associated sprocket wheel.

The summation planetary gears were primarily driven by a propulsion drive and the engagement with the zero shaft superimposed steering control over the sprocket wheels. Since the hydrostatic units were continuously variable, the steering control superimposed upon the propulsion drive by the zero shaft was infinitely variable. Thus, the vehicle negotiated a curve which was proportionate to the steering angle or degree of steering wheel rotation imposed by the vehicle operator whose steering wheel was linked to the variable speed pump.

Superposition steering systems of the foregoing type with infinitely variable steering drives have been typically illustrated in U.S. Pat. No. 4,327,603 dated May 4, 1982, and U.S. Pat. No. 4,497,218 dated Feb. 5, 1985, both issued to the assignee of the present invention.

The advent of heavier tracked vehicles driven by larger engines resulted in the necessity to provide larger, heavier and more costly hydrostatic drive units capable of generating the increased power necessary to effectuate superimposed steering control. The need to increase steering efficiency so as to reduce the requirements for unduly large hydrostatic units resulted in the development of a combined mechanical and infinitely variable hydrostatic steering drive system as exemplified in U.S. Pat. No. 3,938,604 issued Feb. 17, 1976 to the assignee of the present invention.

Such system included a mechanical steering input drive powered directly from the vehicle engine and an infinitely variable hydrostatic input drive, whose hydrostatic pump was driven from the vehicle engine. The two steering inputs were integrated in a controlled sequence at a mechanical steering transmission. The output of the mechanical steering transmission drove a neutral shaft for superimposed steering control of sprocket wheels which drove vehicle tracks.

The system disclosed in U.S. Pat. No. 3,938,604 resulted in a significant reduction in the power requirements of hydrostatic units to $\frac{1}{3}$ of the total power required for steering control. The remaining power for steering control was provided through the mechanical input drive.

There remained a need, however, for still further reductions in the power requirements of variable drives and for further improvements in steering efficiency at relatively large turning radii. Increases in steering efficiency at large turning radii were also desired to obtain precise positioning of large guns mounted to turretless tracked vehicles.

In addition, faster response and high maneuverability mandated by battlefield conditions remained a goal for tracked vehicle steering systems.

SUMMARY OF THE INVENTION

A superimposed steering system for a tracked vehicle comprise an infinitely variable steering input drive integrated with an engine driven mechanical steering input drive. The system includes a steering transmission comprising a plurality of epicyclic gears some of which are driven by both the infinitely variable drive and the mechanical drive. A neutral shaft is connected to and driven by the steering transmission output.

Various epicyclic gears have brakes or couplings which are engaged to selectively control power flow from each of the inputs so that the transmission output is driven through different gear arrangements as a function of a steering angle, i.e. the degree of steering wheel rotation.

The steering transmission is shiftable under load through five different speeds, i.e. gearing arrangements, with each speed change being smooth and relatively undetectable. A first speed stage A is engaged for straight travel or travel with a slight steering angle to the right or left and with the neutral shaft driven solely by the infinitely variable drive. An intermediate left turn stage B or right turn stage C with an intermediate steering angle range wherein the zero shaft is driven primarily by the mechanical input drive is also provided. In the intermediate stages B, C, the variable input drive provides an integrated reaction component of steering transmission output speed and power.

In the intermediate stages B, C, the variable input drive initially serves to reduce steering transmission output speed from that provided solely by the mechanical input drive. The variable input drive speed is gradually reduced to increase the transmission output speed as the steering angle increases until such point as the variable drive input stops so that steering transmission output is provided solely by the mechanical input. Thereafter, further increases in steering angle within the intermediate stages B, C results in increased variable drive output in a reverse direction of rotation to augment the rotation speed and power component provided by the mechanical input drive.

In addition, a high speed or maximum range left turn stage D and right turn stage E is provided wherein alternate epicyclic gears are engaged for greater steering transmission output. In the high speed stages the neutral shaft is driven primarily by the mechanical input. The continuously variable drive initially serves to reduce steering transmission output speed from that which would be provided solely by the mechanical input drive and gradually reduces its speed with increased steering angle to increase the transmission output speed until the continuously variable drive input reverses its direction and augments the mechanical input drive until maximum output speed and power is provided at maximum steering angle.

In accordance with the invention, only one brake or coupling is opened or closed sequentially to engage each stage of transmission operation. As a result, high operating reliability is achieved concurrently with rapid response time, e.g. 0.8 seconds, between full reversals of maximum steering angle in slalom type maneuvers.

From the foregoing compendium, it will be appreciated that it is an aspect of the present invention to provide a superposition steering system of the general character described which overcomes the disadvantages of prior systems.

It is a consideration of the present invention to provide a superposition steering system of the general character described for a tracked vehicle which permits usage of continuously variable drive units of lower power, size and weight then heretofore required to meet the same steering power requirements.

A feature of the present invention is to provide a superposition steering system of the general character described for a tracked vehicle which provides increased efficiency.

To provide a superposition steering system of the general character described for tracked vehicles which is well suited to meet the rigors of military maneuvers by providing complete steering control from maximum steering angle in one turn direction to maximum steering angle in the opposite turn direction in less than one second is a further consideration of the present invention.

Yet another aspect of the present invention is to provide a superposition steering system of the general character described for a tracked vehicle which requires but a modicum of space.

A further feature of the present invention is to provide a superposition steering system of the general character described for a tracked vehicle which includes a steering transmission for integrating mechanical and infinitely variable steering input drives with three shiftable under load speed stages for each direction of turning.

Another aspect of the present invention is to provide a steering transmission of the general character described for superposition steering control of a tracked vehicle wherein three gear speed stages are provided for each direction of turn with the transmission being shiftable under load by actuation of a single shift coupling for each speed stage.

Yet another feature of the present invention is to provide a superposition steering system of the general character described having high operating reliability.

To provide a superposition steering system of the general character described for tracked vehicles which is relatively low in cost and suitable for economical mass production fabrication is yet a further consideration of the present invention.

Other aspects features and considerations of the present invention in part will be obvious and in part will be pointed out hereinafter.

With these ends in view, the invention finds embodiment in certain combinations of elements, series of steps and arrangements of parts by which the said aspects, features and considerations and certain other aspects, features and considerations are hereinafter attained, all with reference to the accompanying drawings and the scope of which will be more particularly pointed out and indicated in the appended claims.

BRIEF DESCRIPTION OF THE DRAWINGS

In the accompanying drawings in which are shown some of the various embodiments of the invention.

DESCRIPTION OF THE PREFERRED EMBODIMENTS

Figure 1:
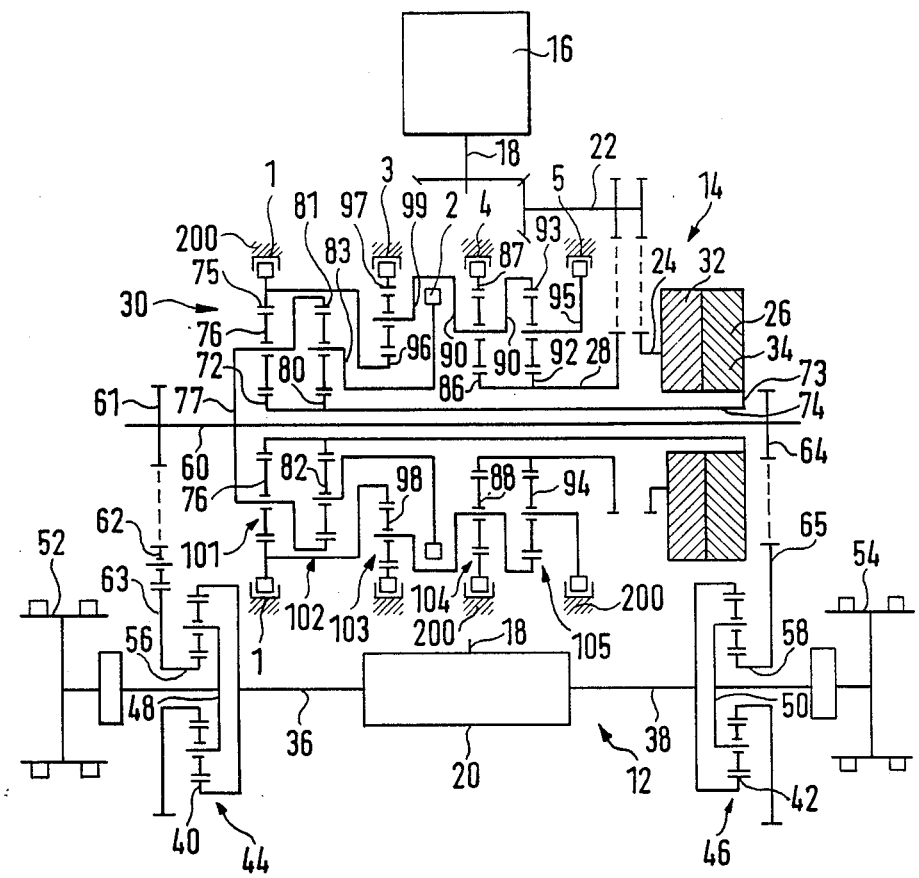
FIG. 1 is a schematized illustration of a tracked vehicle drive system comprising a propulsion drive and a superposition steering system constructed in accordance with and embodying the invention.

Referring now in detail to the drawings wherein like numerals denote like components in the various embodiments, the reference numeral 12 denotes generally a tracked vehicle drive system constructed in accordance with and embodying the invention. The drive system 12 is driven by a vehicle engine or motor 16 having an output shaft 18 through a suitable gear train 22 which drives a superposition steering system 14 constructed in accordance with the invention.

The engine output shaft 18 also extends to an input of a vehicle propulsion drive 20. The propulsion drive 20 generally includes a speed change gearing which is shiftable under load. One propulsion drive output shaft 36 is connected to a ring gear 40 of a summing differential gear 44 and another output shaft 38 of the propulsion drive 20 is connected to the ring gear 42 of a summing differential gear 46. A cage or planet carrier 48 of the summing differential gear 44 constitutes the output element of the summing differential gear and drivingly engages a chain or track driving sprocket wheel 52. Similarly, a cage or planet carrier 50 of the summing differential gear 46 comprises an output element and drivingly engages a chain or track driving sprocket wheel 54.

In accordance with the present invention, a steering transmission 30 is provided for driving a neutral or zero shaft 60. Adjacent one end of the neutral shaft 60, a gear train 61, 62, 63 drivingly engages the sun gear 56 of the summing differential gear 44. At the other end of the neutral shaft 60, a gear train 64, 65 drivingly engages a sun gear 58 of the summing differential gear 46. The gear train 61, 62, 63 contains one more gear than the gear train 64, 65 so that the sun gears 56, 58 are driven in opposite directions The vehicle tracks are driven by the track sprocket wheels 52, 54 in a conventional manner with the propulsion drive 20 providing propulsion input to each of the summing differential gears 44, 46 and with the neutral shaft 60 effecting steering control by driving the sun gears of the summing differentials 44, 46 in a conventional manner.

It should be appreciated that with respect to each summing differential gear 44, 46, the ring gears, planet carriers and sun gears may be substituted for one another with respect to their functions as driving element, driven element and reaction element.

As previously mentioned, pursuant to the invention, the steering transmission 30 serves to integrate a mechanical steering input drive which is powered directly from the vehicle engine through a gear train and an infinitely variable input drive which may comprise a hydrostatic steering drive 26 including a hydrostatic pump 32 having an input 24 driven by the gear train 22 and a hydrostatic motor 34. Alternately, the infinitely variable steering drive input units 26 may comprise any other continuously controllable unit such as an electric generator 32 and an electric motor 34.

The steering transmission 30 includes a first epicyclic differential gear 101 having a sun gear 72 which is driven by a hollow shaft 74. The shaft 74 is in turn, drivingly connected to an output element 73 of the continuously variable steering drive 26 by, for example, a spur gear. The first epicyclic differential gear 101 also includes a planet carrier 77 which carries a plurality of planet gears 76 with the planet gears 76 engaging both the sun gear 72 and a ring gear 75. A first shift coupling 1 serves to brake the ring gear 75 of the first epicyclic differential gear 101 by engagement with a frame 200 of the steering transmission.

It should be noted that the planet carrier 77 comprises the output element of the first epicyclic differential gear 101 and is drivingly fixed to the neutral shaft 60. The carrier 77 also comprises the sole output of the entire steering transmission 30.

The steering transmission 30 also includes a second epicyclic differential gear 102 having a sun gear 80 which is also driven by the continuously variable steering drive 26 through the hollow shaft 74. The second epicyclic differential gear 102 includes a plurality of planet gears 82 carried on a planet carrier 83 and which engage a ring gear 81. The ring gear 81 is interconnected to the planet carrier 77 of the first epicyclic differential gear 101 for unitary rotation therewith.

In addition, the steering transmission 30 includes a fourth epicyclic differential gear 104 having a sun gear 86 which is driven by a mechanical steering input drive comprising a gear train driven by the gear train 22 which is driven by the engine output shaft 18. The mechanical input drive engages hollow shaft 28 which is concentric with the neutral shaft 60 and the hollow shaft 74. The fourth epicyclic differential gear 104 also includes a plurality of planet gears 88 joined to a planet carrier 90. The planet gears 88 engage both the sun gear 86 and a ring gear 87.

Associated with the fourth epicyclic differential gear 104 is a fourth shift coupling, 4 which comprises a brake for braking and blocking the ring gear 87 against the frame 200 of the steering transmission 30.

A fifth epicyclic differential gear 105 is also provided. The fifth gear includes a sun gear 92, fixed to the hollow shaft 28 as is the sun gear 86. The fifth epicyclic differential gear 105 also includes a plurality of planet gears 94 interconnected to a planet carrier 95. The planet gears 94 engage the sun gear 92 and a ring gear 93 which rotates with the planet carrier 90 of the fourth epicyclic differential gear 104.

Associated with the fifth gear 105 is a fifth shift coupling 5 which comprises a brake for selectively blocking rotation of the planet carrier 95 by braking against the frame 200.

The foregoing described steering transmission epicyclic differential gears and shift couplings are similar in operation and structure to that disclosed in U.S. Pat. No. 3,938,604 which is incorporated herein by reference. The present invention differs, however, from such prior teaching in that additional shift stages of operation are provided which permit greater reduction in the power requirements of the variable steering drive units operating power and size.

In accordance with the present invention, the steering transmission 30 also includes a third epicyclic differential gear 103 having a sun gear 96. The sun gear 96 is connected for rotation unitarily with the ring gear 75 of the first gear 101. In addition, the third gear 103 also includes a plurality of planet gears 98 coupled to a planet carrier 99. The planet carrier 99 is unitary with the planet carrier 90 of the fourth epicyclic differential gear 104. The planet gears 98 of the third epicyclic differential gear 103 engage both the sun gear 96 and a ring gear 97.

The steering transmission 30 also includes a third shift coupling, 3 associated with the epicyclic differential gear 103 and which comprises a brake for blocking rotation of the ring gear 97.

In addition, the steering transmission 30 also includes a second shift coupling, 2 which is engaged to connect the planet carrier 83 of the second epicyclic differential gear 102 with the planet carriers 90 and 99 of the third epicyclic differential gear 103 and the fourth epicyclic differential gear 104, respectively.

With the engine 16 operating and all couplings 1, 2, 3, 4 and 5 open, both the mechanical steering input drive and the variable steering input drive are free wheeling and no steering power is transmitted to the neutral shaft 60. For stabilization of straight vehicle travel, the shift coupling 1 is closed as indicated in FIG. 7, corresponding to the first speed stage A.

Figure 3:
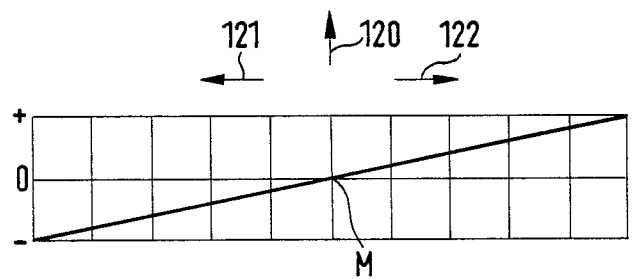
FIG. 3 comprises a graphic representation of a tracked vehicle steering angle or degree of steering wheel rotation.
Figure 6:
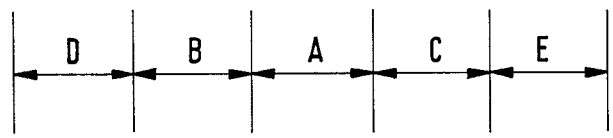
FIG. 6 comprises a graphic representation of various speed stages of a steering transmission of the steering system correlated with the steering angles depicted in FIG. 3 and with stages A, B and D indicating stages corresponding to a counterclockwise steering angle and stages A, C, and E corresponding to a clockwise steering angle.
Figure 7:
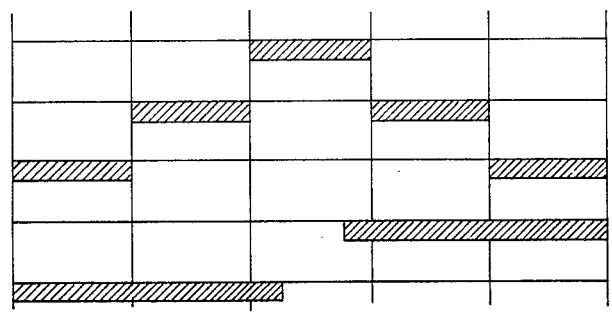
FIG. 7 comprises a schematized graphic representation of shifting sequences of shift couplings of the steering system with the couplings being denoted along a vertical axis and with closed couplings being represented by hatched areas correlated along a horizontal axis with the steering angles and component states shown in FIGS. 3, 4, 5 and 6 such that the closed shift couplings result in the component operating stages depicted in FIGS. 4, 5 and 6.

The shift coupling 1 remains closed, as indicated in FIG. 7, within a range of steering angle in both a clockwise direction, (represented as a positive value in FIG. 3) and a counterclockwise direction (represented by a negative value in FIG. 3). The shift coupling 1 remains closed throughout the steering angle range of FIG. 3 within the limits of the stage A, depicted in FIG. 6.

In FIG. 3, straight vehicle travel is represented at zero steering angle by an arrow 120 which extends through a horizontal center M of all of the graphic representations shown in FIGS. 3 through 7. A left turn of the vehicle, corresponding to counterclockwise steering angle is represented by an arrow 121 and right turn of the vehicle, corresponding to clockwise steering angle is represented by an arrow 122. During a right turn, the steering angle of FIG. 3 is increased in a clockwise or positive direction of rotation while a left turn is increased in a counterclockwise or negative direction of rotation.

Figure 4:
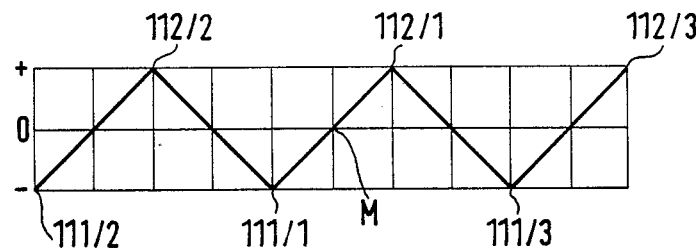
FIG. 4 is a graphic representation of the rotation direction and speed of the output of a continuously variable steering drive input unit of the superposition steering system correlated, along a horizontal axis, with the steering angles depicted in FIG. 3.

As long as the steering angle lies within the limits of stage A of FIG. 6, the turning of the vehicle is only effected through the continuously variable drive output element 73, commencing with zero rotational speed of the element 73 with a steering angle in the center, M, up to a maximum negative value for a left turn of 111/1 and up to a maximum positive value 112/1 for a right turn as illustrated in FIG. 4.

Figure 8:
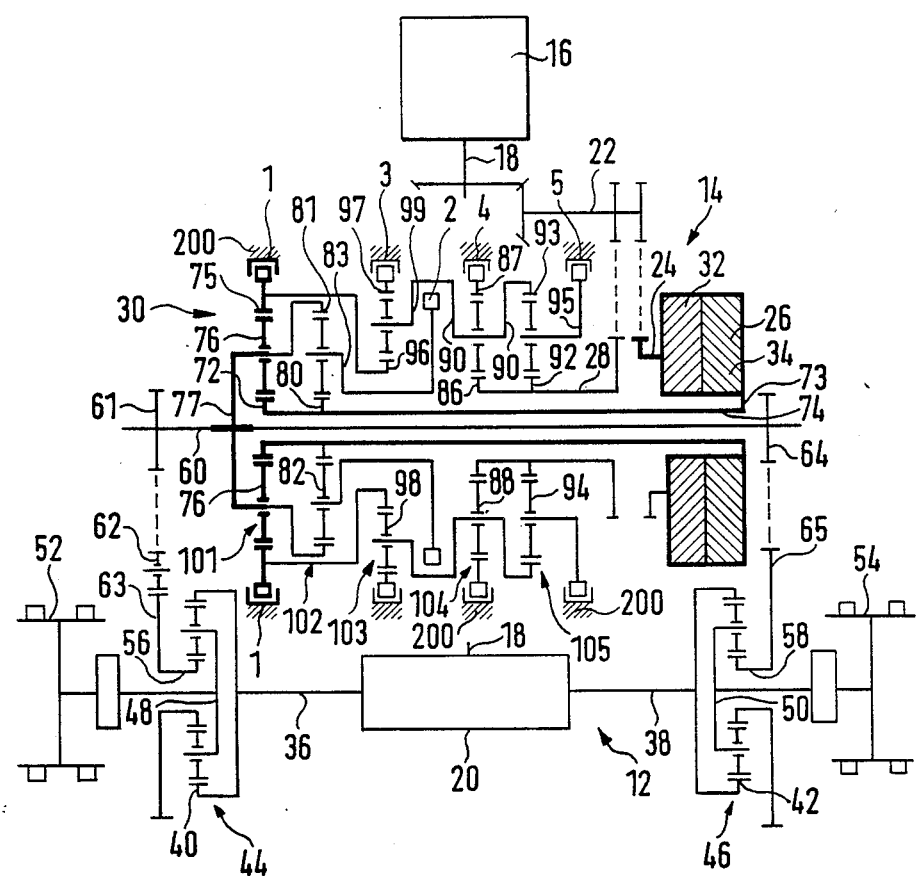
FIG. 8 comprises a schematized representation of the drive system depicted in FIG. 1 in the operating speed stage denoted as A in FIG. 6 and with drivingly engaged elements being configured in thick lines.

With reference now to FIG. 8 wherein speed stage A power flow is depicted, since the coupling 1 is closed, the remaining components of the steering transmission 30 function solely for torque bracing. Rotation of the output element 73 rotates the hollow shaft 74 which rotates the sun gear 72. The sun gear 72 drives the planet gears 76 which engage the fixed ring gear 75 and thus cause the planet carrier 77 to rotate, driving the neutral shaft 60.

For steering angles depicted in FIG. 3 lying outside the range of stage A of FIG. 6, the steering transmission 30 must be set to one of the other operating stages depicted in FIG. 6, wherein different gearing speeds are required and the mechanical input drive is utilized.

Once a steering angle is outside the range of stage A, the shift coupling 1 is required to be opened and either the coupling 5 is closed to actuate the epicyclic differential gear 105 for power input through the mechanical input drive for making left turns, or the coupling 4 is closed for interconnecting the epicyclic differential gear 104 with the mechanical input drive for making right turns. As shown in FIG. 7, the couplings 5 or 4 can be closed at any point in time as long as the coupling 1 is still closed for stage A.

For shifting to one of the stages B, D for left turn running 121, or for shifting to one of the stages, C or E for right turn running 122, only one of the couplings 2 or 3 need by closed. The advantages of being able to shift by closing only a single coupling include increased reliability and reduction in the time required to effect various steering maneuvers. For example, under battle conditions during slalom running of the vehicle, the steering wheel can be alternately turned from maximum clockwise steering angle to maximum counterclockwise steering angle in an extremely short time duration for example, within 0.8 seconds.

Figure 9:
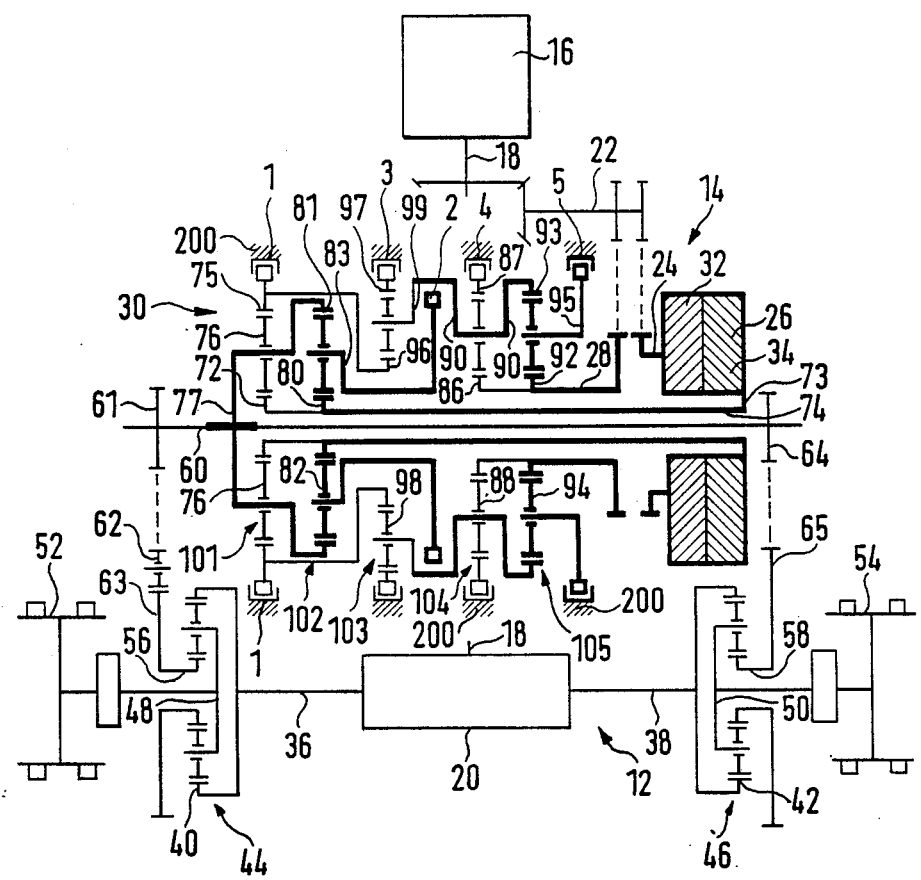
FIG. 9 is a schematized representation of the drive system of FIG. 1 in the operating speed stage B and with the drivingly engaged element being configured in thick lines.

As illustrated in FIG. 9, in stage B, the mechanical input drive rotates the hollow shaft 28 which rotates the sun gear 92. Since the planet carrier 95 of the epicyclic differential gear 105 is blocked, sun gear rotation causes rotation of the ring gear 93. The ring gear 93 rotates the planet carrier 83 of the epicyclic differential gear 102 because the coupling 2 is closed. Rotation of the carrier 83 rotates the ring gear 81 which is fixed to the carrier 77 which drives the neutral shaft 60. The sun gear 80, driven by the variable input drive 26 acts as a reaction element.

Figure 5:
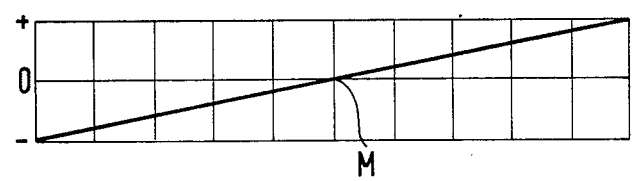
FIG. 5 graphic representation of the rotation direction and speed of a neutral shaft of the superposition steering system correlated, along a horizontal axis, with the steering angles depicted in FIG. 3.

Increasing the negative steering angle shown in FIG. 3 which corresponds to a greater steering wheel counterclockwise deflection for left turn travel, 121, within stage B from the termination of stage A to the beginning of stage B as illustrated in FIG. 6, results in initially decreasing the rotational speed of the output element 73 of the variable drive unit 26 from the rotational speed value 111/1 to the zero and thereafter increasing the rotational speed of the element 73, in the opposite direction to a maximum positive value of 112/2. During this procedure, the negative rotational speed of the neutral shaft 60, as illustrated in FIG. 5, is continuously increased over the entire range of steering angle indicated in stage B.

Further increase of the steering angle in a counterclockwise direction up to the maximum steering wheel rotation results in a transition from stage B to stage D. As illustrated in FIG. 7, the coupling 2 opens and the coupling 3 closes at transition.

Figure 10:
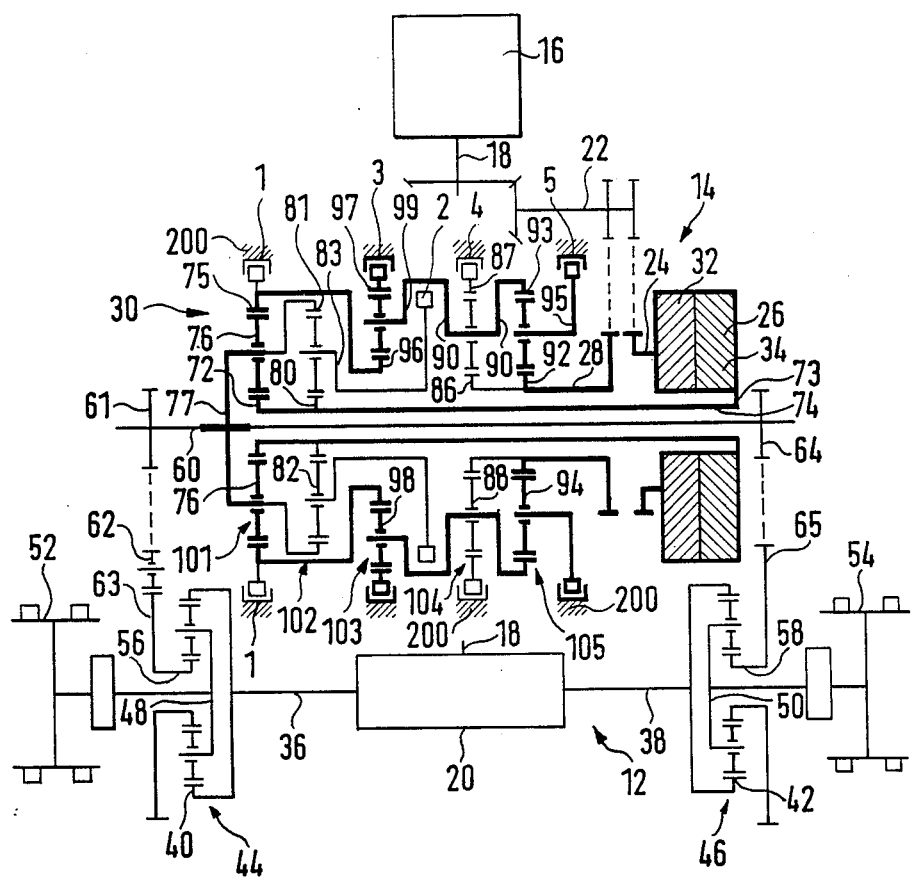
FIG. 10 is a schematized representation of the drive system of FIG. 1 in the operating speed stage D and with drivingly engaged elements being configured in thick lines.

Referring now to FIG. 10, in stage D, the mechanical input drive rotates the hollow shaft 28 which rotates the spur gear 92. Since the planet carrier 95 of the gear 105 is blocked, sun gear rotation causes rotation of the ring gear 93. The ring gear 93 rotates the planet carrier 99 of the third epicyclic differential gear 103. Because the coupling 3 is now closed, rotation of the carrier 99 drives the sun gear 96 which is connected to the ring gear 75 of the first epicyclic differential gear 101. Rotation of the ring gear 75 rotates the carrier 77 which drives the neutral shaft. The sun gear 72, driven by the variable input drive 26, acts as a reaction element.

Greater counterclockwise steering angle within stage D decreases the output speed of the output element 73 of the variable steering input unit 26, hence the speed of the sun gear 72, from the maximum positive rotational value shown at 112/2 through zero and then continuously increases such speed in the opposite direction of rotation to a maximum negative value of 111/2. Since the coupling 3 is closed, the neutral shaft 60 is driven from the carrier 77 of the first epicyclic differential gear 101 with continuously increasing negative rotational speed up to the maximum negative rotational speed indicated in FIG. 5 at the terminal end of stage D of FIG. 6.

To negotiate a right turn 122, prior to entry into the transmission stages C and E, the right turn shift coupling 4 is closed and the left turn shift coupling 5 is kept open. The running operation of the stages C and E are analogous to the operation of the transmission components in the corresponding left turn stages B and D in other respects, however. To enter stage C, the coupling 2 is closed and to enter stage E the coupling 2 is opened while the coupling 3 is simultaneously closed.

Figure 11:
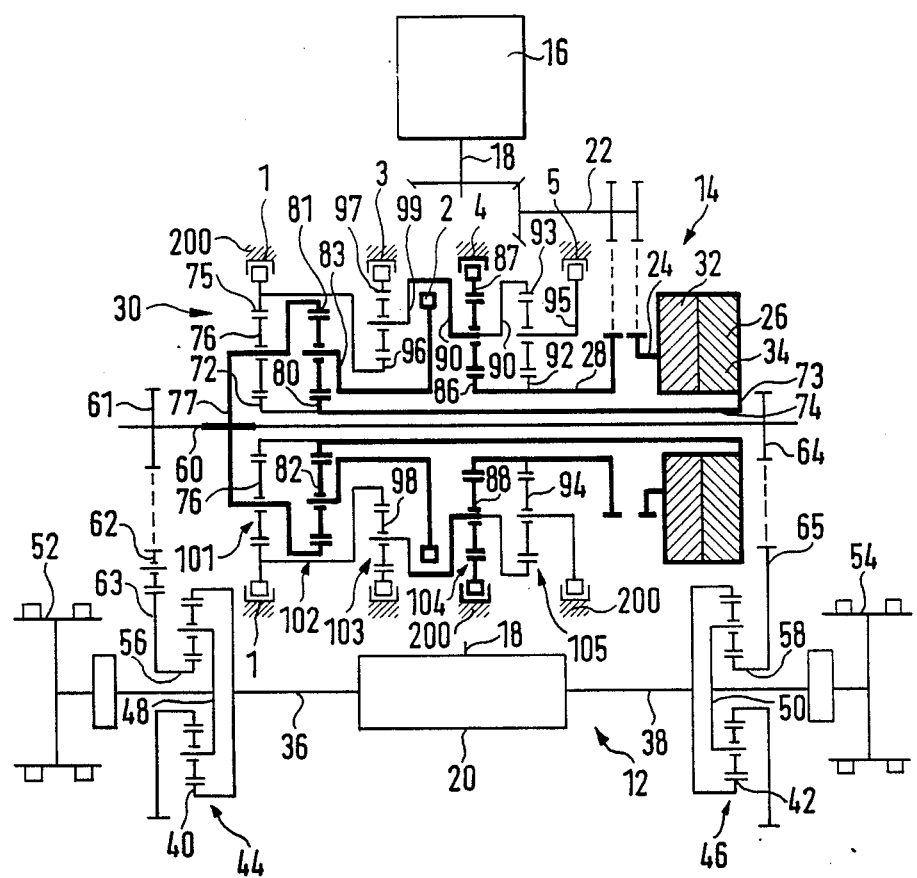
FIG. 11 comprises a schematized representation of the drive system of FIG. 1 in the operating speed stage C, again with the drivingly engaged elements being configured in thick lines.

Referring now to FIG. 11, in stage C, the mechanical input drive rotates the hollow shaft 28 which rotates the sun gear 86 of the fourth epicyclic differential gear 104. Since the ring gear 87 is blocked by the coupling 4, sun gear rotation causes rotation of the planet carrier 90 which is coupled to the planet carrier 83 of the second epicyclic differential gear 102 by the closed coupling 2.

Rotation of the carrier 83 rotates the ring gear 81 which is fixed to the carrier 77 which drives the neutral shaft 60. The sun gear 80, driven by the variable input drive 26, acts as a reaction element.

As illustrated in FIG. 4, upon entry into stage C, the rotational speed of the output element 73 of the variable steering input drive unit 26 is reduced continuously from a maximum positive value of 112/1, to zero and thereafter increased in a reverse direction of rotation to a maximum negative value of 111/3.

Figure 12:
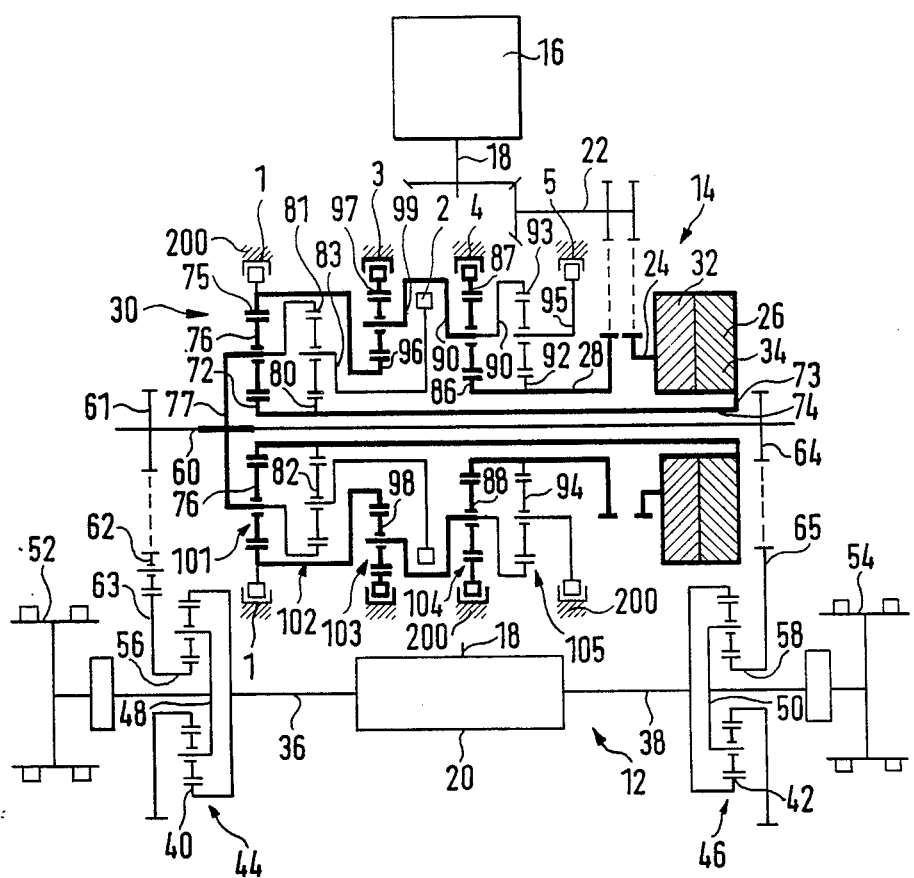
FIG. 12 comprises a schematized representation of the drive system of FIG. 1 in the operating speed stage E, with the drivingly engaged elements being configured in thick lines.

With reference to FIG. 12, in stage E the mechanical input drive rotates the hollow shaft 28 which rotates the sun gear 86 of the fourth epicyclic differential gear 104. Since the ring gear 87 is blocked by the closed coupling 4, sun gear rotation causes rotation of the planet carrier 99 of the third epicyclic differential gear 103. Because the coupling 3 is closed, rotation of the carrier 99 drives the sun gear 96 which is connected to the ring gear 75 of the first epicyclic differential gear 101. Rotation of the ring gear 75 rotates the carrier 77 which drives the neutral shaft. The sun gear 72, driven by the variable input drive 26, acts as a reaction element.

As illustrated in FIG. 4, during stage E, the speed of the output element 73 of the variable steering drive unit 26 is reduced from the maximum negative value of 111/3, to zero and thereafter increased continuously in the opposite, positive direction of rotation, up to the maximum positive value of 112/3.

FIG. 5 illustrated that the rotational speed of the neutral shaft, starting from no rotational movement at M, is continuously increased from zero to a positive maximum value. For right turn travel 122 of the vehicle, the direction of rotation of the neutral shaft 60 is opposite to that for left turn travel 121. It should also be appreciated that the maximum positive values of variable steering drive unit output, 112/1, 112/2, and 112/3 as well as the maximum negative values, 111/1, 111/2, and 111/3 are of identical magnitude.

As graphically illustrated in FIGS. 6 and 7, in stage A only the shift coupling 1 is closed. Within stage A, on approaching stage B, the left turn coupling 5 is closed. At the end of stage A and upon entering stage B the shift coupling 1 is opened and simultaneously the coupling 2 is closed. At the end of stage B and upon entering stage D, the coupling 2 is opened and the coupling 3 is simultaneously closed.

On turning back from a left turn to straight ahead running from stage D, through stage B to stage A, the coupling 3 is opened and simultaneously the coupling 2 is closed for phase B operation. Thereafter, the coupling 2 is opened and simultaneously the coupling 1 is closed at entry into stage A. At any arbitrary steering angle within stage A, the left turn shift coupling 5 is opened.

To enter into right turn stage operation, at any arbitrary steering angle within stage A, approaching the stage C end of stage A, the right turn shift coupling 4 is closed. Upon entry into stage C, the shift coupling 1 is opened and simultaneously the shift coupling 2 is closed; during transition from stage C to stage E, the shift coupling 2 is opened and simultaneously the shift coupling 3 is closed.

On returning from extreme right turn operation to straight travel at the stage C end of stage E, the coupling 3 is opened and simultaneously the coupling 2 is closed for shifting into stage C. During transition from stage C to stage A, the shift coupling 2 is opened and simultaneously the shift coupling 1 is closed. At any arbitrary steering angle within phase A the right turn steering coupling 4 is opened.

The couplings 1, 2 and 3 are advantageously shifted in each instance with slip overlapping each other during shifting between the phases A, B, D or A, C, E as depicted in FIG. 6 so that smooth, jolt-free running of the neutral shaft with continuous rotational speed change as graphically illustrated in FIG. 5 is provided.

In the steering transmission 30, all of the epicyclic differential gears 101, 102, 103, 104 and 105 as well as the variable steering drive unit 26 are arranged axially in sequence, behind one another with the epicyclic gears 101, 102, 103, 104 and 105 being coaxial with the neutral shaft 60.

Figure 2:
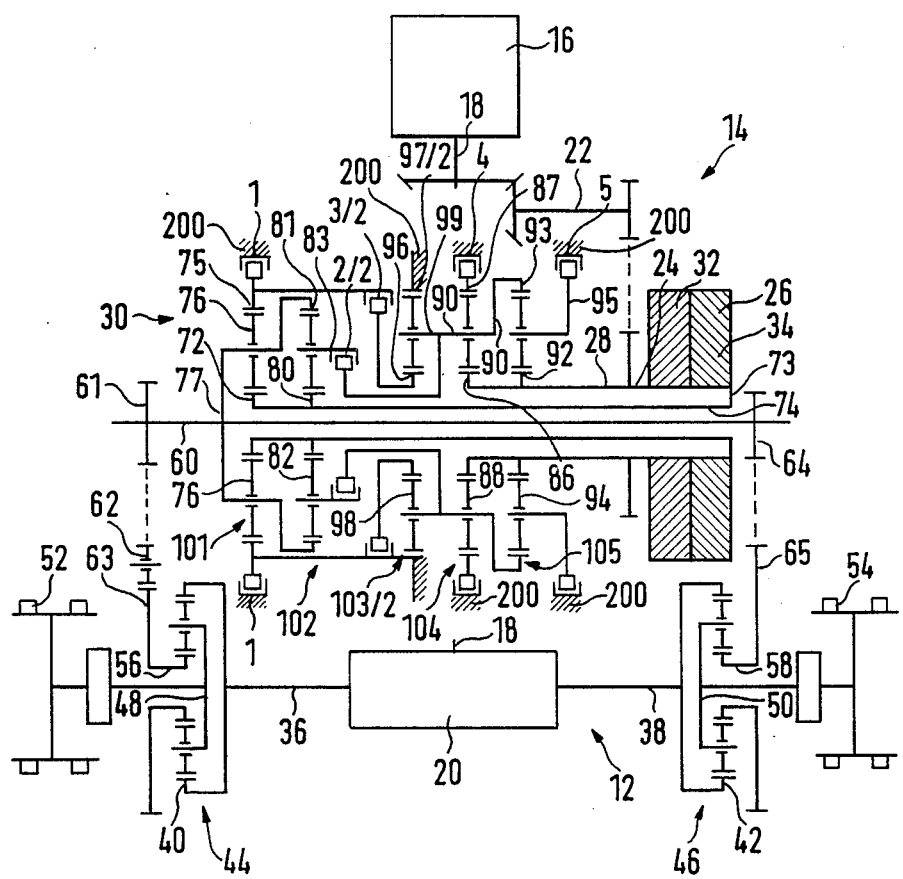
FIG. 2 is a schematized illustration of a further drive system for a tracked vehicle having a superposition steering system constructed in accordance with an alternate embodiment of the invention.

The alternate embodiment of the superposition drive system 12 depicted in FIG. 2 functions in substantially the same manner as the FIG. 1 embodiment with respect to speed stages. The graphic representations of FIGS. 3 through 7 are equally applicable to this embodiment.

Identical reference numbers have been provided for corresponding components of FIG. 1 and FIG. 2 with, however, the suffix /2 has been applied to elements which are structurally different yet functionally identical to the correspondingly numbered elements in the embodiment of FIG. 1. Accordingly, in FIG. 7, in addition to the reference numerals 2 and 3 denoting the corresponding shift couplings of the FIG. 1 embodiment, one will also find the reference numerals 2/2 and 2/3 which denote the correspondingly numbered shift couplings of the embodiment of FIG. 2.

Referring now to FIG. 2, it will be seen that a superposition steering system 14 includes a steering transmission 30 which drives a neutral shaft 60 for superimposing steering control through two summing differential gears, 44, 46.

The steering transmission 30 of the embodiment of FIG. 2 includes a first epicyclic differential gear 101 having a sun gear 72 which is driven by a hollow shaft 74. The shaft 74 is, in turn, drivingly connected to an output 73 of a continuously variable steering drive 26. The first epicyclic differential gear 101 also includes a planet carrier 77 which carries a plurality of planet gears 76 with the planet gears 76 engaging both the sun gear 72 and a ring gear 75. A first shift coupling 1 serves to brake the ring gear 75 by engaging with a frame 200 of the steering transmission 30. As with the prior embodiment, the planet carrier 77 comprises the output element of the first epicyclic differential gear 101 and is drivingly fixed to the neutral shaft 60. The carrier 77 also comprises the sole output of the entire steering transmission 30.

The FIG. 2 steering transmission 30 also includes a second epicyclic differential gear 102 having a sun gear 80 which is driven by the continuously variable steering drive 26 through the hollow shaft 74. The second epicyclic differential gear 102 includes a plurality of planet gears 82 carried on a planet carrier 83 and which engage a ring gear 81. The ring gear 81 is interconnected to the planet carrier 77 of the first epicyclic differential gear 101 for unitary rotation therewith in a manner identical to that of the FIG. 1 embodiment.

In addition, the transmission 30 includes a fourth epicyclic differential gear 104 having a sun gear 86 which is driven by a mechanical steering input drive comprising a gear train driven by a gear train 22 which is driven by an engine output shaft 18. The mechanical input drive engages a hollow shaft 28 which is concentric with the neutral shaft 60 and the hollow shaft 74. The fourth epicyclic differential gear 104 also includes a plurality of planet gears 88 joined to a planet carrier 90 with the planet gears 88 engaging both the sun gear 86 and a ring gear 87.

Associated with the fourth epicyclic differential gear 104 is a fourth shift coupling, 4 which comprises a brake for braking and blocking the ring gear 87 against the frame 200.

A fifth epicyclic differential gear 105 is also provided in the FIG. 2 embodiment. The fifth gear includes a sun gear 92 fixed to the hollow shaft 28 for driving engagement through the engine output shaft 18. The fifth epicyclic differential gear 105 also includes a plurality of planet gears 94 interconnected to a planet carrier 95. The planet gears 94 engage both the sun gear 92 and a ring gear 93 which rotates with the planet carrier 90 of the fourth epicyclic differential gear 104. Associated with the fifth gear 105 is a fifth shift coupling 5 which comprises a brake selectively blocking rotation of the planet carrier by engaging against the frame 200.

Pursuant to the invention, the steering system 14 of the FIG. 2 embodiment also includes a third epicyclic differential gear 103/2 having a sun gear 96 and a ring gear 97/2 which is blocked against rotation by being fixed to the frame 200. In addition the third gear 103 includes a plurality of planet gears 98 coupled to a planet carrier 99. The planet carrier 99 and the planet carrier 90 of the fourth epicyclic differential gear 104 is formed as a single unit connected to the ring gear 93 of the fifth gear 105 for rotation unitarily therewith. The planet gears 98 of the third epicyclic differential gear 103/2 engage both the sun gear 96 and the fixed ring gear 97/2.

In addition, according to the invention, a third shift coupling 3/2 is provided. The coupling 3/2 is joined to the sun gear 96 of the third epicyclic differential gear 103/2 and serves to couple the sun gear 96 to the ring gear 75 of the first epicyclic differential gear 101 for unitary rotation therewith.

The FIG. 2 embodiment also includes a second shift coupling 2/2 for connecting the planet carrier 83 of the second epicyclic differential gear 102 with the planet carrier 99 of the third planet gearing 103/2 as well as the planet carrier 90 of the fourth epicyclic differential gear 104 for unitary simultaneous rotation. The planet carriers 99 and 90 of the third epicyclic differential gear 103/2 and the fourth epicyclic differential gear 104 are unitarily connected. The shift couplings 1, 2/2, 3/2, 4 and 5, as well as the shift couplings 1, 2, 3, 4, and 5 of the embodiment of FIG. 1 are directly connected with the elements to be braked or blocked, without intermediate gearing or components.

The individual speed shift stages A, B and D as well as the stages C and E as illustrated in FIG. 6 are achieved, with respect to the embodiment of FIG. 2, by engaging the couplings as illustrated in the graphic representation of FIG. 7, in a manner similar to that with respect to the FIG. 1 embodiment. Instead of engaging shift coupling 2 of FIG. 1, shift coupling 2/2 is engaged and instead of engaging shift coupling 3 of the FIG. 1 embodiment, shift coupling 3/2 is engaged.

Figure 13:
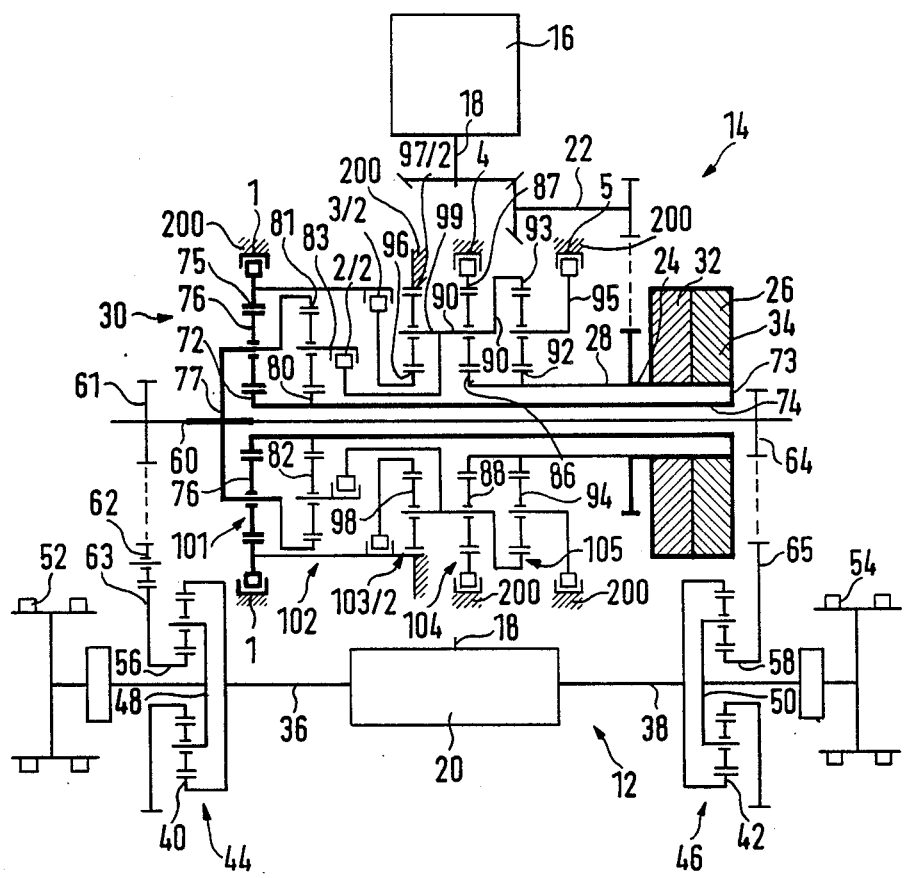
FIG. 13 comprises a schematized representation of the drive system of the alternate embodiment depicted in FIG. 2, the system being engaged in the operating speed stage A and with the drivingly engaged elements being configured in thick lines.
Figure 14:
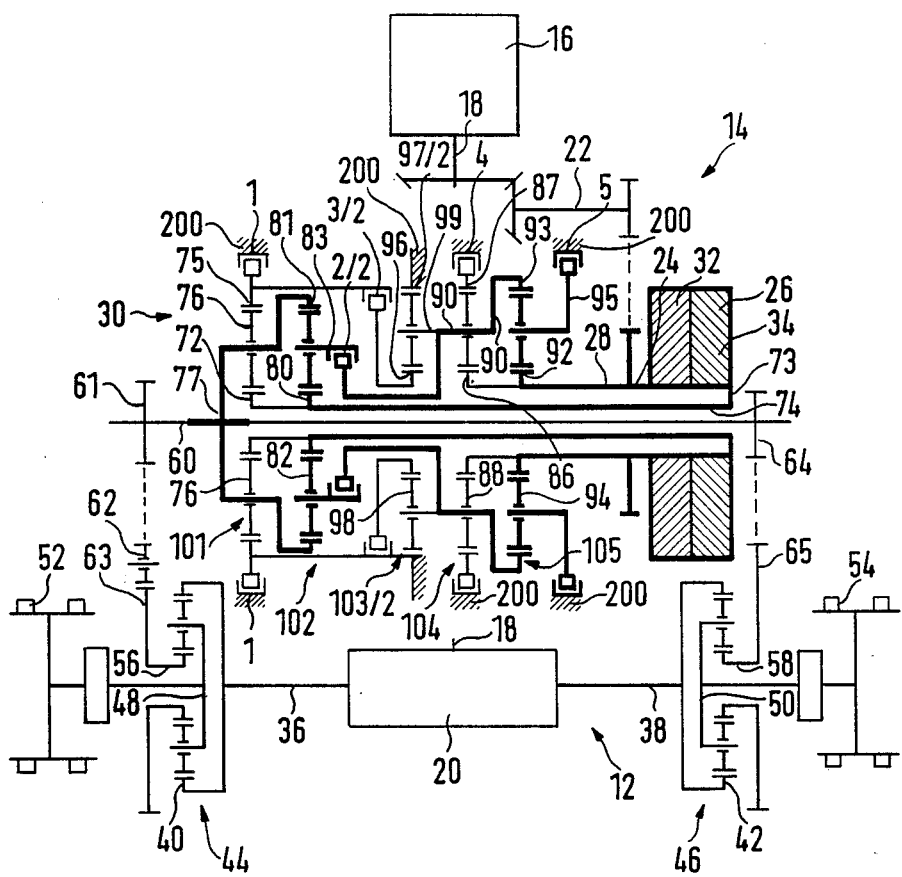
FIG. 14 a schematized representation of the drive system of FIG. 2 in the operating speed stage B and with the drivingly engaged elements being configured in thick lines.
Figure 15:
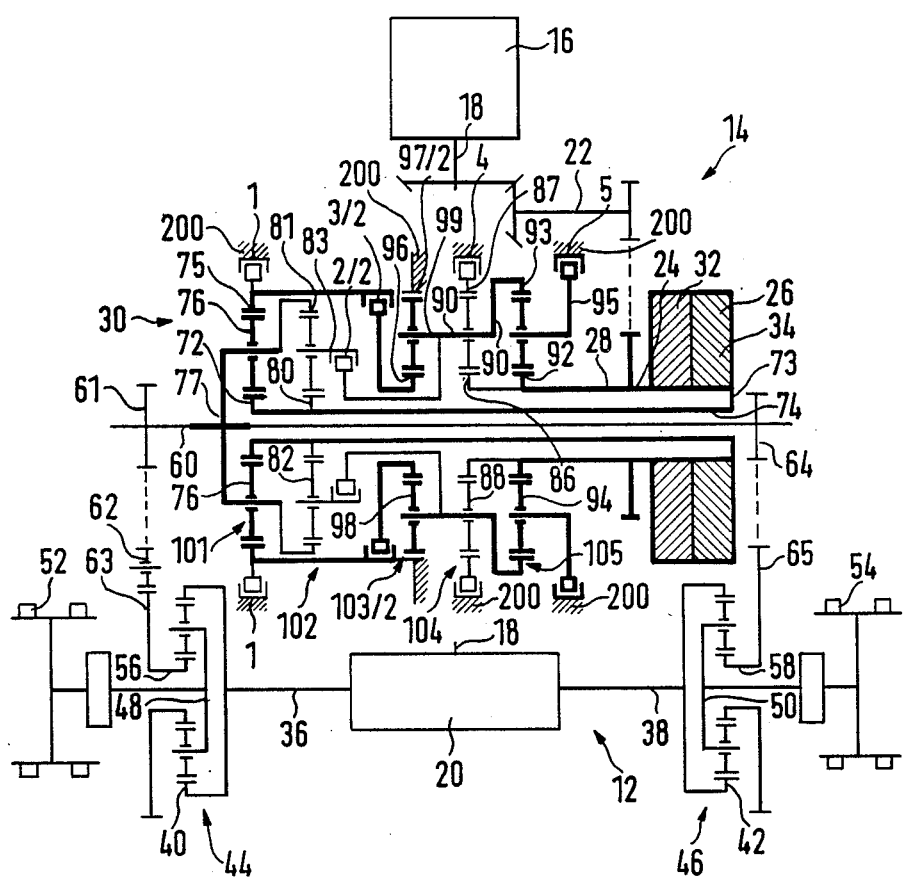
FIG. 15 comprises a schematized representation of the drive system depicted in FIG. 2 in the operating speed stage D and with the drivingly engaged elements being configured in thick lines.
Figure 16:
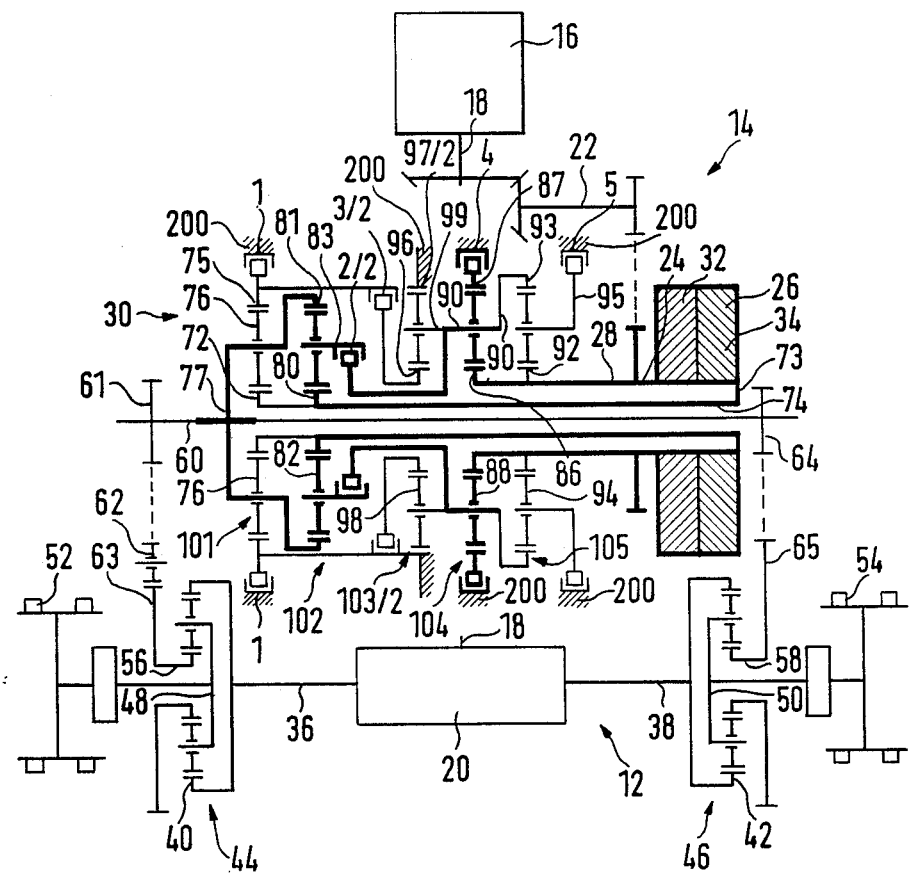
FIG. 16 comprises a schematized representation of the drive system depicted in FIG. 2 in the operating speed stage C and with the drivingly engaged elements being configured in thick lines.
Figure 17:
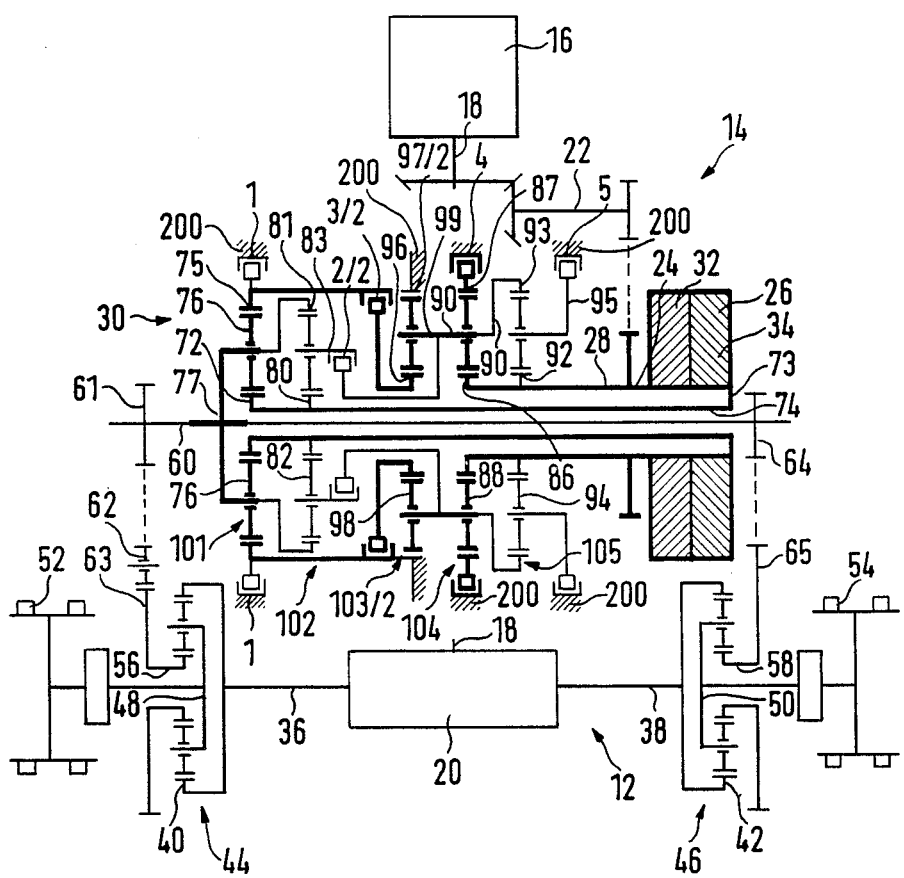
FIG. 17 comprises a schematized representation of the drive system depicted in FIG. 2 in the operating speed stage E and with the drivingly engaged elements being configured in thick lines.

Steering power flow is transmitted through the elements of the steering transmission 30 of the FIG. 2 embodiment throughout the various speed stages by employing the elements depicted in thick lines in the illustrations of FIGS. 13 through 17. The components illustrated in thick lines in FIG. 13 represents the engaged power flow elements in stage A; the thick lines in FIG. 14 illustrate power flow through the engaged elements in stage B; the thick lines in FIG. 15 illustrate power flow through the engaged elements for stage D; the thick lines in FIG. 16 represent power flow through the engaged elements in stage C and the thick lines in FIG. 17 of the drawings represent power flow through the engaged elements in stage E.

The instantaneous rotational speed and direction of the output element 73 of the variable steering drive 26 of the FIG. 2 embodiment for various steering angles is represented in FIG. 4. Also, the neutral shaft speed and direction of rotation for the FIG. 2 embodiment is depicted in FIG. 5.

Both embodiments of the invention have the advantage of requiring smaller steering drive units 26 which are of lower power than would be required utilizing existing systems. In fact, utilization of the steering transmission 30 of either embodiment results in a power requirement reduction for the variable steering drive unit 26 to 20% of the total steering power requirement, with the mechanical input drive, powered directly from the engine, meeting the balance of the power requirements.

The variable steering input unit 26 and the couplings, with respect to both embodiments of the invention can be actuated to operate as function of steering angle in accordance with the invention utilizing a control system as disclosed in U.S. Pat. No. 3,938,604.

Thus it will be seen that there is provided a superposition steering system with integrated mechanical and infinitely variable drives which achieves the various aspects, features and considerations of the present invention and which is well adapted to meet the conditions of practical usage.

Having thus described the invention there is claimed as new and desired to be secured by Letters Patent

1. In a superposition steering system for a tracked vehicle having a pair of summation planetary gears for driving vehicle tracks with the summation planetary gears being driven by a propulsion drive, the steering system including:
  (a) a neutral shaft interconnected to the summation planetary gears for superimposing steering control, the steering system further including
  (b) a continuously variable steering drive input unit having an output element with continuously variable rotational speed,
  (c) a mechanical steering input drive, and (d) a steering transmission for integrating the continuously variable steering input drive with the mechanical steering input drive, the steering transmission being shiftable under load without power interruption between a plurality of operating stages, the steering transmission comprising
  (i) a first epicyclic differential gear having a sun gear connected with the output element of the continuously variable steering input drive unit, a plurality of planet gears, a planet carrier, and a ring gear, the planet carrier comprising an output element of the steering transmission and being connected to the neutral shaft,
  (ii) first shift coupling means interconnected with the ring gear of the first epicyclic differential gear for selectively blocking ring gear rotation,
  (iii) a second epicyclic differential gear, the second gear having a sun gear connected with the output element of the variable steering input drive, the second epicyclic differential gear including a plurality of planet gears and a planet carrier, the second gear further including a ring gear, the ring gear being connected with the planet carrier of the first epicyclic differential gear,
  (iv) a fourth epicyclic differential gear, the fourth gear having a sun gear connected to the mechanical steering input drive, a plurality of planet gears, a planet carrier and a ring gear,
  (v) fourth shift coupling means for selectively blocking rotation of the ring gear of the fourth epicyclic differential gear,
  (vi) a fifth epicyclic differential gear, the fifth gear including a sun gear connected with the mechanical steering input drive, a plurality of planet gears, a planet carrier and a ring gear,
  (vii) fifth shift coupling means for selectively blocking the planet carrier of the fifth gear,
(e) the improvement comprising:
  (i) a third epicyclic differential gear, the third gear including a sun gear connected with the ring gear of the first epicyclic differential gear, the third epicyclic differential gear further including a plurality of planet gears, a planet carrier and a ring gear,
  (ii) the third epicyclic differential gear planet carrier being connected with the planet carrier of the fourth epicyclic differential gear,
  (iii) third shift coupling means for selectively blocking the ring gear of the third epicyclic differential gear and
  (iv) second shift coupling means for selectively connecting the planet carrier of the second epicyclic differential gear with the planet carriers of the third epicyclic differential gear and the fourth epicyclic differential gear.

2. A superposition steering system constructed in accordance with claim 1 wherein the planet carrier of the third epicyclic differential gear and the planet carrier of the fourth epicyclic differential gear are formed as a single integral unit.

3. A superposition steering system constructed in accordance with claim 1 wherein the steering transmission includes a frame, the first, third, fourth and fifth shift coupling means including means for blocking rotation by engagement with the frame.

4. A superposition steering system constructed in accordance with claim 1 wherein the continuously variable steering drive unit comprises a hydrostatic pump and a hydrostatic motor, the output element of the variable steering drive unit comprising an output element of the hydrostatic motor.

5. A superposition steering system constructed in accordance with claim 1 wherein the continuously variable steering drive unit comprises an electric generator and an electric motor, the output element of the variable steering drive comprising an output element of the electric motor.

6. In a superposition steering system for a tracked vehicle having a pair of summation planetary gears for driving vehicle tracks with the summation planetary gears being driven by a propulsion drive, the steering system including:
(a) a neutral shaft interconnected to the summation planetary gears for superimposing steering control, the steering system further including
(b) a continuously variable steering drive input unit having an output element with continuously variable rotational speed,
(c) a mechanical steering input drive, and
(d) a steering transmission for integrating the continuously variable steering input drive with the mechanical steering input drive, the steering transmission being shiftable under load without power interruption between a plurality of operating stages, the steering transmission comprising
  (i) a first epicyclic differential gear having a sun gear connected with the output element of the continuously variable steering input drive unit, a plurality of planet gears, a planet carrier, and a ring gear, the planet carrier comprising an output element of the steering transmission and being connected to the neutral shaft,
  (ii) first shift coupling means interconnected with the ring gear of the first epicyclic differential gear for selectively blocking ring gear rotation,
  (iii) a second epicyclic differential gear, the second gear having a sun gear connected with the output element of the variable steering input drive the second epicyclic differential gear including a plurality of planet gears and a planet carrier, the second gear further including a ring gear, the ring gear being connected with the planet carrier of the first epicyclic differential gear,
  (iv) a fourth epicyclic differential gear, the fourth gear having a sun gear connected to the mechanical steering input drive, a plurality of planet gears, a planet carrier and a ring gear,
  (v) fourth shift coupling means for selectively blocking rotation of the ring gear of the fourth epicyclic differential gear,
  (vi) a fifth epicyclic differential gear, the fifth gear including a sun gear connected with the mechanical steering input drive, a plurality of planet gears, a planet carrier and a ring gear,
  (vii) fifth shift coupling means for selectively blocking the planet carrier of the fifth gear,
(e) the improvement comprising:
  (i) a third epicyclic differential gear, the third gear including a sun gear, a plurality of planet gears, a planet carrier and a ring gear, means blocking the ring gear against rotation, the planet carrier being connected with the planet carrier of the fourth epicyclic differential gear;
  (ii) third shift coupling means for selectively interconnecting the sun gear of the third epicyclic differential gear with the ring gear of the first epicyclic differential gear and;

(iii) second shift coupling means for selectively connecting the planet carrier of the second epicyclic differential gear with the planet carriers of the third epicyclic differential gear and the fourth epicyclic differential gear.

7. A superposition steering system constructed in accordance with claim 6 wherein the planet carrier of the third epicyclic differential gear and the planet carrier of the fourth epicyclic differential gear are formed as a single integral unit.

8. A superposition steering system constructed in accordance with claim 6 wherein the steering transmission includes a frame, the first, fourth and fifth shift coupling means including means for blocking rotation by engagement with the frame.

9. A superposition steering system constructed in accordance with claim 6 wherein the continuously variable steering drive unit comprises a hydrostatic pump and a hydrostatic motor, the output element of the variable steering drive unit comprising an output element of the hydrostatic motor.

10. A superposition steering system constructed in accordance with claim 6 wherein the continuously variable steering drive unit comprises an electric generator and an electric motor, the output element of the variable steering drive comprising an output element of the electric motor.

* * * * *